United States Patent Office 2,773,039
Patented Dec. 4, 1956

2,773,039

MAGNETICALLY STRONG FERROMAGNETIC MAGNESIUM-ZINC TYPE OF FERRITE

Ernst Albers Schoenberg, Metuchen, N. J., assignor to Steatite Research Corporation, Keasbey, N. J., a corporation of Delaware No Drawing. Application November 24, 1952, Serial No. 322,339

1 Claim. (Cl. 252—62.5)

This invention relates to a magnetically strong ferromagnetic ceramic material consisting primarily of the magnesium zinc type of ferrite.

It is among the objects of the invention therefore to provide a ferrite body which is essentially of the zinc-magnesium type but which has strong magnetic properties and a relatively high Curie point.

The ferrites comprise a group of crystal type compounds of the general formula X(M″O)Y(Fe₂O₃) in which M″O stands for one or several bivalent metal oxides and in which X:Y is approximately 1:1. Most of these compounds have a spinel structure and ferromagnetic properties. When M″O is ferrous oxide the ferrite is the mineral magnetite. Most of the ferrites which have a high permeability contain an essential proportion of nickel oxide as one of the bivalent metal oxides. Nickel oxide is expensive and restricted in war time so that it would be an advantage to produce a ferrite with high permeability properties without the addition of any great amount of nickel oxide.

One way of obtaining ferrites with good properties is to replace the nickel oxide by manganese oxide. Manganese zinc ferrites exhibit excellent properties but these ferrites have to be fired in a strictly controlled neutral atmosphere, a procedure not easily carried out especially when large quantities of magnetic cores have to be handled. Manganese, furthermore, is not too plentiful either.

The ferrites made from the bivalent oxides of magnesium and zinc offer the advantage that these materials are easily available and that the magnesium-zinc ferrites do not require firing in a protective atmosphere, i. e., no special precautions need to be taken to include protective gases nor to exclude atmospheric air during firing, cooling or other heat treatment of these ferrites. However, there is a disadvantage too, the magnesium-zinc ferrites are not very strong magnetically.

This application is a continuation-in-part of my application No. 248,889, filed September 28, 1951, now Patent No. 2,670,331. In that application the idea of improving the magnetic properties of the magnesium-zinc ferrites by substituting or adding a small amount of cupric oxide is disclosed. By such an addition of 1.5–8% of cupric oxide, or preferably 2–5% of the latter, a significant increase in initial permeability and saturation flux density and a great increase in maximum permeability is attained. In that application the possibility of adding nickel oxide as an optional constituent is also disclosed.

It has been found, however, that magnesium-zinc and magnesium-zinc-copper ferrites of high initial permeability—for a wide scope of applications initial permeabilities of 600 or more are required—the Curi point of such compositions comes down to about 90 to 95° C. When magnetic cores of such ferrites are employed in television sets, for example, the heat developed by the electronic tubes may raise the temperature of the core close to the temperature of 95° C. whereupon permeability and saturation flux density drop and as a result the voltage required across the transformer is decreased.

This invention is based on the discovery that a relatively minor amount of nickel oxide added to the composition of said prior application increases the magnetic strength as well as the Curie temperature to an unexpected degree permitting the employment of the resulting ferrites in devices which may develop higher temperatures. The amount of nickel oxide required to markedly improve the Curie point can be as small as 2% by weight. A maximum degree of improvement is noted with the addition of 2–4% of nickel although additional improvements in properties are noted with additions of over 4% of nickel (up to 8%, for example).

Of course, as set forth in said prior application any significant amount of nickel oxide improves the properties of the product. However, since the nickel is scarce, emphasis is laid on the fact that in the 4-bivalent oxide ferrite system MgO—NiO—CuO—ZnO—Fe₂O₃ a comparatively small amount of nickel oxide works out very effectively.

The copper oxide (CuO) is added in the proportion of 1.25–7%. It may be added as such or in the form of a salt such as the basic copper carbonate, for example, (Cu(OH)₂.2CuCO₃).

The total proportion of bivalent oxides (zinc oxide, magnesium oxide, cupric oxide and nickel oxide) is approximately equal to the mol proportion of Fe₂O₃ but can vary from 1:0.9 to 1:1.1. A small amount (up to 3 mol percent) of lithium oxide (added as the carbonate) may also be included.

The overall composition of the body may therefore vary between the approximate limits shown in the following table:

|  | Mol, Percent | Weight, Percent |
|---|---|---|
| MgO | 8–25 | 3–10 |
| ZnO | 25–14 | 20–10 |
| CuO | 2–11 | 1.5–8 |
| NiO | 3–12 | 2–8 |
| Li₂O | 0–3 | 0–0.5 |
| Fe₂O₃ | 47.4–52.4 | 67–81.0 |

The invention, both as to its organization and its method of operation, together with additional objects and advantages thereof, will best be understood from the following description of specific embodiments when read in connection with the accompanying examples.

Example 1

A mix consisting of the following ingredients in the proportions stated is wetball-milled for 15 hours, then dried, and pulverized.

| Compound | Mol Percent | Weight Percent |
|---|---|---|
| CuO | 4 | 2.85 |
| ZnO | 22 | 16.0 |
| NiO | 4 | 2.65 |
| MgO | 20 | 7.15 |
| Fe₂O₃ | 50 | 71.35 |
| Total | 100 | 100 |

An appropriate manner of synthesizing a body of this kind is to precalcine the MgO together with a part of the ZnO and a part of the Fe₂O₃, this calcine constituting about 50% of the total mixture. Enough water to make a moldable granulation (5%, for example) is added and the moist powder is pressed into the form of a ring. The molded ring is fired at 1300° C. while permitting the free access of air.

Example 2

A prefired nickel-zinc ferrite containing approximately 18 mol percent of nickel oxide, 30 mol percent of zinc oxide and 52 mol percent of $Fe_2O_3$ (corresponding to approximately 10% by weight of nickel oxide, 20% by weight of zinc oxide and approximately 70% by weight of ferric oxide) is ground to a powder and introduced into the following composition.

|  | Percent by weight | Approximate mol percent |
|---|---|---|
| Nickel-zinc calcine | 20.0 {NiO / ZnO / $Fe_2O_3$} | 3.6 / 6 / 10.4 |
| CuO | 2.9 | 4 |
| ZnO | 12.8 | 16 |
| MgO | 7.2 | 20 |
| $Fe_2O_3$ | 57.1 | 40 |
| Total | 100 | 100 |

(As much as 60% scrap may be employed for incorporating the required amount of nickel into the composition.)

Example 3

A mix containing the following ingredients is wet ball-milled for 15 hours then dried and pulverized:

|  | Mol Percent | Weight Percent |
|---|---|---|
| MgO | 8.9 | 3.0 |
| ZnO | 23.6 | 16.0 |
| NiO | 10.3 | 6.5 |
| bas. copper carbonate | 6.2 | 6.0 |
| $Fe_2O_3$ | 51.0 | 68.5 |

The whole mix is subjected to a mild prefiring process at 1050° C., then reground, and after addition of 1% of an organic binder and 4% of water, molded into suitable cores. The cores are fired in air at about 1320° C.

This body was tested at various temperatures from 28° C. to 150° C. The Curie point is not sharp and although a maximum value of $\mu_0$ is obtained at about 120° C. the body is usable up to at least 150° C.

The products described have the following properties:

|  | Example 1 | Example 2 | Example 3 28° C. | Example 3 75° C. | Example 3 110° C. | Example 3 150° C. |
|---|---|---|---|---|---|---|
| Initial permeability | 800 | 600 | 600 | 860 | 1,000 | 920 |
| Maximum permeability | 3,700 | 2,000 | 3,800 | 3,200 | 2,650 | 2,080 |
| Saturation flux density | 3,000 | 3,000 | 3,500 | 3,700 | 3,400 | 2,800 |
| Curie point ° C. | 125 | 115 | Not sharp—about 150° C. | | | |

From the two examples it can be seen, that the relatively small amount of nickel oxide is more efficient when added in the raw state, than if it is incorporated from a calcine. As compared to a product which does not contain nickel, not only are the initial permeability, maximum permeability, and saturation flux density increased by the addition of nickel oxide but the Curie point is considerably increased over that of about 95° C. for the nickel-free products. Thus the temperature range of usefulness of the said ferrites is considerably increased. The system MgO—NiO—CuO—ZnO—$Fe_2O_3$ offers means and ways to exploit a small amount of nickel oxide most economically.

The features and principles underlying the invention described above in connection with specific exemplifications will suggest to those skilled in the art many other modifications thereof. It is accordingly desired that the appended claim shall not be limited to any specific features or details shown and described in connection with the exemplifications thereof.

I claim:

A fired ferromagnetic body of high permeability properties and having a Curie point above 120° C. consisting essentially of the following ingredients in the proportions indicated:

|  | Mol percent |
|---|---|
| MgO | 8–25 |
| ZnO | 25–14 |
| CuO | 2–11 |
| NiO | 3–12 |
| $Li_2O$ | 0–3 |
| $Fe_2O_3$ | 47.4–52.4 |

References Cited in the file of this patent

UNITED STATES PATENTS

| 1,997,193 | Kato | Apr. 9, 1935 |
| 2,565,058 | Albers-Schoenberg | Aug. 21, 1951 |
| 2,685,568 | Wilson | Aug. 3, 1954 |

OTHER REFERENCES

Philips Technical Review, vol. 8, N. 12 Dec. 1946, page 355.